US012593292B2

(12) United States Patent
Jacobsen et al.

(10) Patent No.: US 12,593,292 B2
(45) Date of Patent: Mar. 31, 2026

(54) USER EQUIPMENT SYNCHRONIZATION DURING HANDOVER

(71) Applicant: Nokia Technologies Oy, Espoo (FI)

(72) Inventors: Thomas Haaning Jacobsen, Aalborg (DK); Troels Emil Kolding, Aalborg (DK); Pilar Andrés Maldonado, Aalborg (DK); Renato Barbosa Abreu, Aalborg (DK); Rakash Sivasiva Ganesan, Munich (DE); Sean Kelley, Naperville, IL (US)

(73) Assignee: Nokia Technologies Oy, Espoo (FI)

( * ) Notice: Subject to any disclaimer, the term of this patent is extended or adjusted under 35 U.S.C. 154(b) by 298 days.

(21) Appl. No.: 18/558,253

(22) PCT Filed: Apr. 26, 2022

(86) PCT No.: PCT/EP2022/060955
§ 371 (c)(1),
(2) Date: Oct. 31, 2023

(87) PCT Pub. No.: WO2022/233632
PCT Pub. Date: Nov. 10, 2022

(65) Prior Publication Data
US 2024/0357442 A1 Oct. 24, 2024

Related U.S. Application Data

(60) Provisional application No. 63/201,638, filed on May 6, 2021.

(51) Int. Cl.
| | |
|---|---|
| *H04W 56/00* | (2009.01) |
| *H04W 36/00* | (2009.01) |
| *H04W 36/08* | (2009.01) |

(52) U.S. Cl.
CPC ... *H04W 56/0015* (2013.01); *H04W 36/0072* (2013.01); *H04W 36/0088* (2013.01); *H04W 56/001* (2013.01); *H04W 36/08* (2013.01)

(58) Field of Classification Search
CPC ......... H04W 56/0015; H04W 36/0072; H04W 36/0088; H04W 56/001; H04W 36/08
See application file for complete search history.

(56) References Cited

U.S. PATENT DOCUMENTS

| | | | | |
|---|---|---|---|---|
| 2013/0070726 A1* | 3/2013 | Zhang | ............... | H04W 56/0045 370/331 |
| 2015/0092738 A1* | 4/2015 | Chakraborty | ......... | H04W 72/21 370/336 |

(Continued)

FOREIGN PATENT DOCUMENTS

| | | |
|---|---|---|
| EP | 3836623 A1 | 6/2021 |
| EP | 3911014 A1 | 11/2021 |

(Continued)

OTHER PUBLICATIONS

Mahmood, Aneeq, et al. "Clock synchronization over IEEE 802. 11—A survey of methodologies and protocols." IEEE Transactions on Industrial Informatics 13.2 (2016): 907-922. (Year: 2016).*

(Continued)

*Primary Examiner* — Sharad Rampuria
(74) *Attorney, Agent, or Firm* — Nokia Technologies Oy

(57) ABSTRACT

Improved techniques of handover include the source gNB estimating the accuracy of the timing information that the UE may derive from its local clock during and shortly after the HO procedure and exchange this with the target gNB. Based on this estimate, the target gNB can determine when a timing information update is needed at the UE.

19 Claims, 9 Drawing Sheets

(56) References Cited

U.S. PATENT DOCUMENTS

2020/0196207 A1    6/2020  Zhang et al.
2024/0214096 A1*   6/2024  Wang ................ H04W 56/0015

FOREIGN PATENT DOCUMENTS

WO    2018/229105  A1    12/2018
WO    2020/029701  A1    2/2020
WO    2020/145248  A1    7/2020

OTHER PUBLICATIONS

"3rd Generation Partnership Project; Technical Specification Group Radio Access Network; NG-RAN; Xn application protocol (XnAP) (Release 16)", 3GPP TS 38.423, V16.5.0, Apr. 2021, pp. 1-461.
"RAN3 impacts of propagation delay compensation enhancements", 3GPP TSG-RAN WG3 Meeting #112-e, R3-XXXXX, Agenda: 21.2, Nokia, May 17-27, 2021, 4 pages.
"[Draft] Reply LS on Time Synchronization assistance parameters", 3GPP TSG-WG RAN2 Meeting #114e, R2-21xxxxx, 3GPP RAN WG2, May xxth-yyth, 2021, 1 page.
"Final feature lead summary on propagation delay compensation enhancements", 3GPP TSG RAN WG1 Meeting #104b-e, R1-2104136, Agenda: 8.3.4, Huawei, Apr. 12-20, 2021, 88 pages.
"Discussion on Further enhanced NR-IIoT: Enhancements for support of time synchronization", 3GPP TSG-RAN WG3 Meeting #111e, R3-210873, Agenda: 21.2, Ericsson, Jan. 25-Feb. 5, 2021, 3 pages.
"Enhancements for support of time synchronization", 3GPP TSG-RAN WG3 Meeting #111e, R3-210874, Ericsson, Jan. 25-Feb. 5, 2021, 11 pages.
"Enhancements for support of time synchronization", 3GPP TSG-RAN WG3 Meeting #111e, R3-210875, Ericsson, Jan. 25-Feb. 5, 2021, 19 pages.
"Time Synchronization Signalling and Mobility Impact Analysis", 3GPP TSG-RAN WG2 Meeting #113 Electronic, R2-2100716, Agenda: 8.5.2, Nokia, Jan. 25-Feb. 5, 2021, 5 pages.
"3rd Generation Partnership Project; Technical Specification Group Radio Access Network; NR; Physical layer procedures for control (Release 16)", 3GPP TS 38.213, V16.5.0, Mar. 2021, pp. 1-183.
"IEEE Standard for a Precision Clock Synchronization Protocol for Networked Measurement and Control Systems", IEEE Instrumentation and Measurement Society, IEEE Std 1588™, Jun. 16, 2020, 499 pages.
International Search Report and Written Opinion received for corresponding Patent Cooperation Treaty Application No. PCT/EP2022/060955, dated Aug. 19, 2022, 13 pages.

* cited by examiner

Example Wireless Network 130

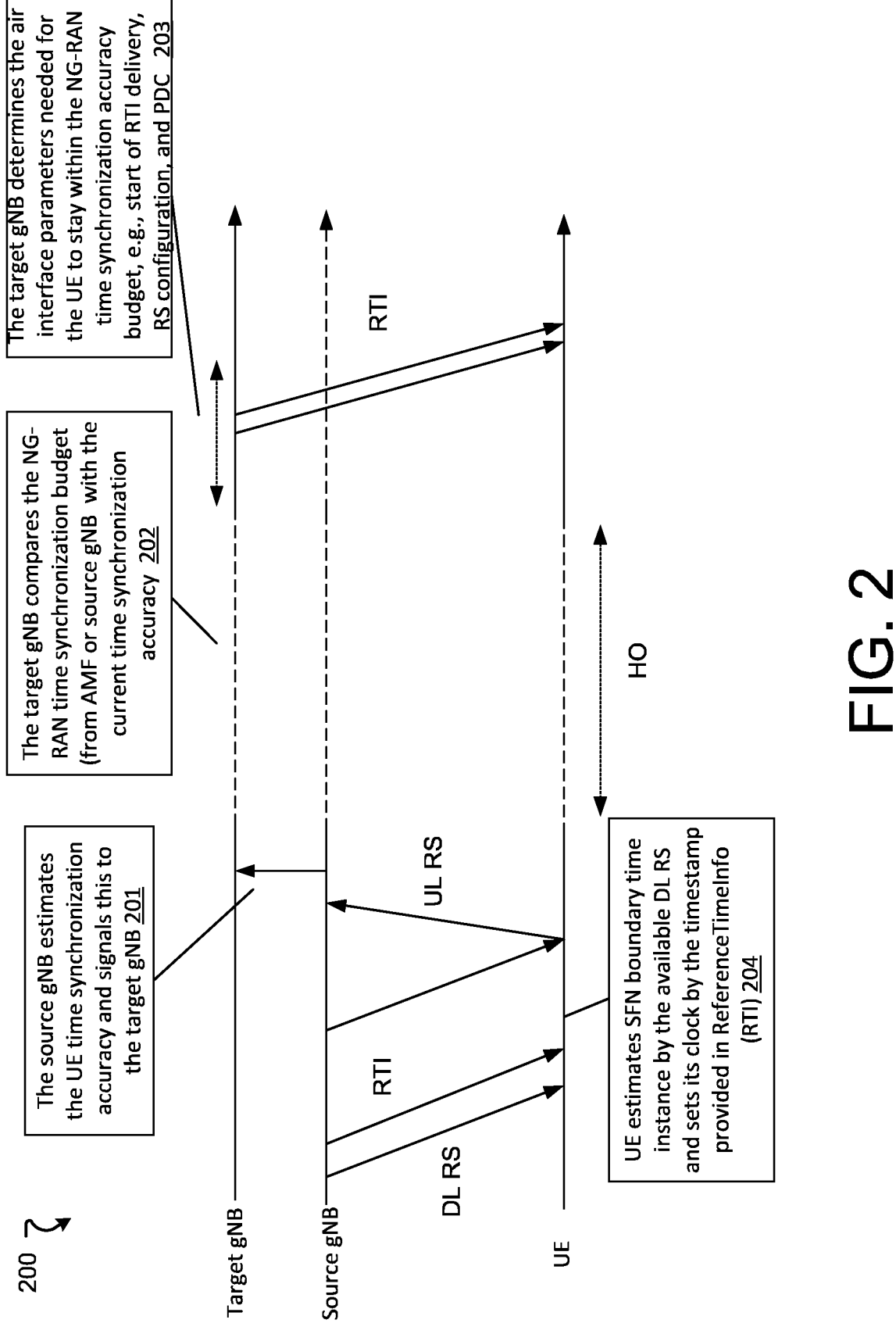

The target gNB determines the air interface parameters needed for the UE to stay within the NG-RAN time synchronization accuracy budget, e.g., start of RTI delivery, RS configuration, and PDC 203

The target gNB compares the NG-RAN time synchronization budget (from AMF or source gNB with the current time synchronization accuracy 202

The source gNB estimates the UE time synchronization accuracy and signals this to the target gNB 201

UE estimates SFN boundary time instance by the available DL RS and sets its clock by the timestamp provided in ReferenceTimeInfo (RTI) 204

RTI

UL RS

RTI

DL RS

HO

Target gNB

Source gNB

HO preperation

UE    Source gNB    Target gNB    AMF

6: Mobility measurement reports

7: Handover decision

8: Estimates UE TS accuracy

9: If the sourceNB needs a better estimate it can request the UE it can initiate a sync process or request the UEs clock accuracy estimation 10: Handover request and UE TS accuracy estimate 11: Two options to capture UE drift in the accuracy estimation:
Alt. 1. sourceNB includes the last time RTI was delivered with the handover request
Alt. 2. sourceNB includes an the worst case unavailability of RTI in the accuracy estimate 12: NG-RAN TS budget for the UE in targetNB 13: Calculates accuracy headroom as NG-RAN budget - TS accuracy estimate 14: Select TS parameters (e.g. selivery time of RTI, DL Rs configuration, PDC option)

15: Determines accuracy feedback based on headroom one of
a1. Flag to indicate accuracy within budget or an a2. Accuracy headroom
b. RTI allocations for early synchronization without complete PRACH
c. A coarse PD estimate either preconfigured (known cell size) or received by the LMF 16: Handover Request ACK and accuracy feedback

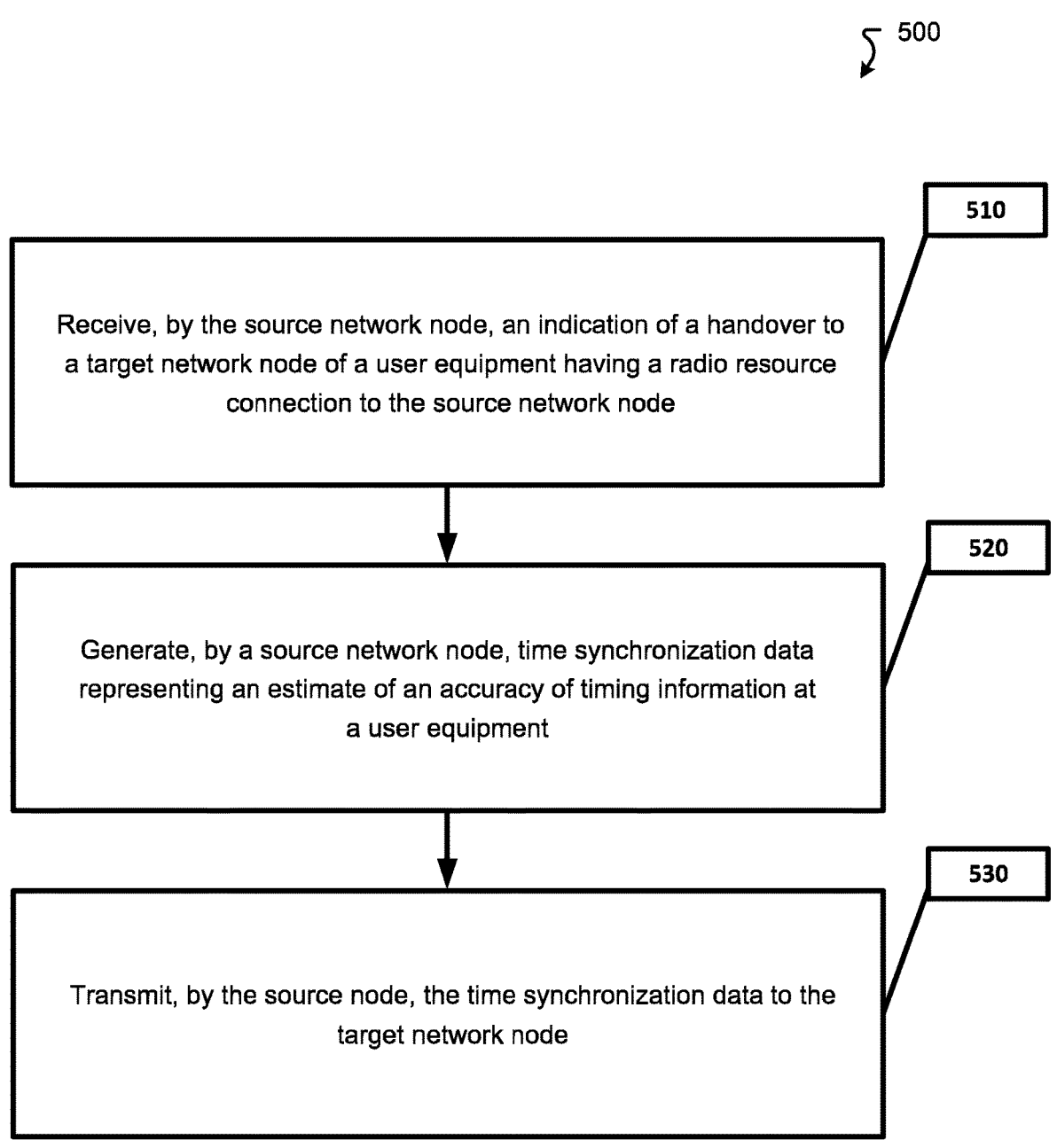

500

510

Receive, by the source network node, an indication of a handover to a target network node of a user equipment having a radio resource connection to the source network node

520

Generate, by a source network node, time synchronization data representing an estimate of an accuracy of timing information at a user equipment

530

Transmit, by the source node, the time synchronization data to the target network node

Figure 6:
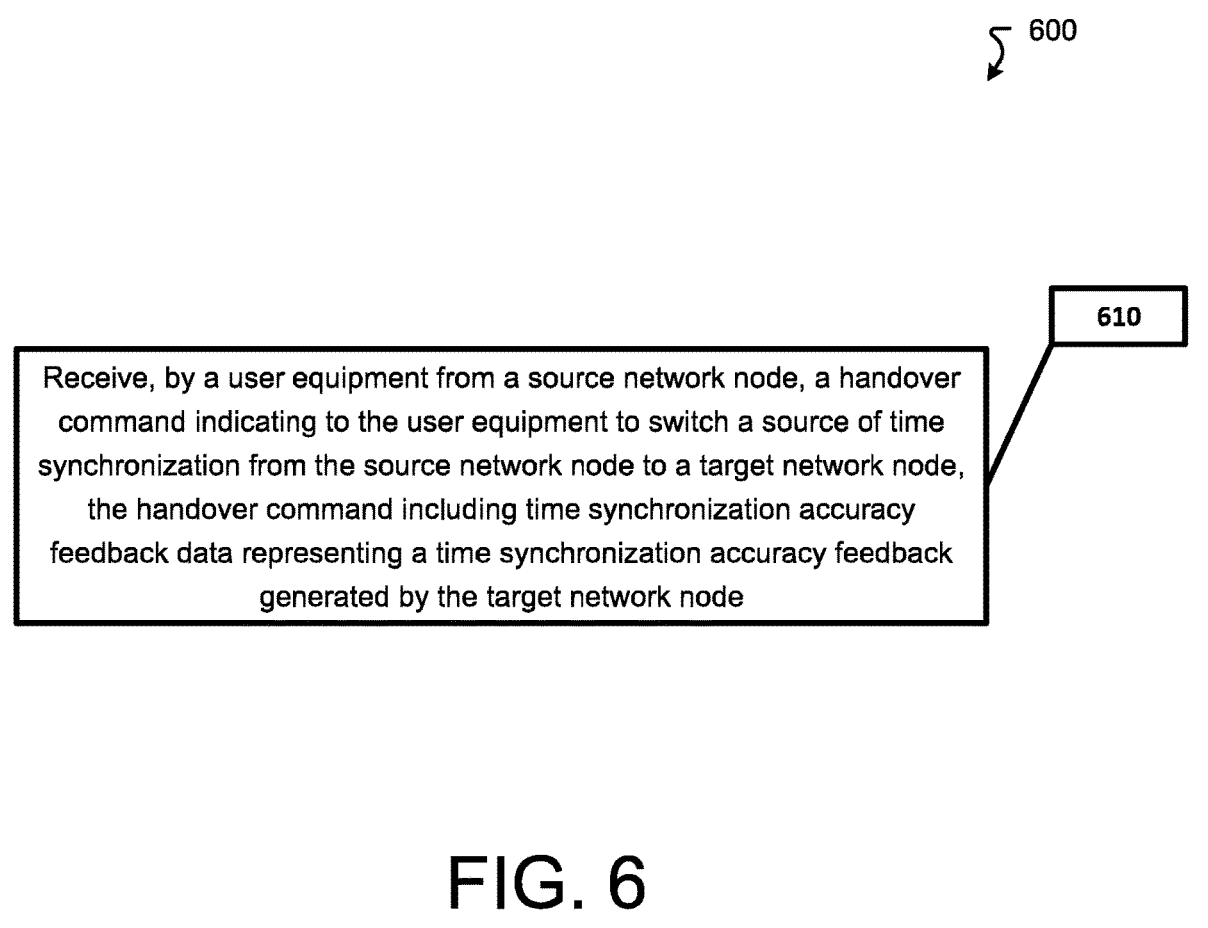

Receive, by a user equipment from a source network node, a handover command indicating to the user equipment to switch a source of time synchronization from the source network node to a target network node, the handover command including time synchronization accuracy feedback data representing a time synchronization accuracy feedback generated by the target network node

USER EQUIPMENT SYNCHRONIZATION DURING HANDOVER

RELATED APPLICATION

This application was originally filed as PCT Application No. PCT/EP2022/060955 on 26 Apr. 2022, which claims priority from U.S. Provisional Application No. 63/201,638, filed on 6 May 2021, each of which is incorporated herein by reference in its entirety.

TECHNICAL FIELD

This description relates to communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the $3^{rd}$ Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's LTE upgrade path for mobile networks. In LTE, base stations or access points (APs), which are referred to as enhanced Node AP (eNBs), provide wireless access within a coverage area or cell. In LTE, mobile devices, or mobile stations are referred to as user equipment (UE). LTE has included a number of improvements or developments.

A global bandwidth shortage facing wireless carriers has motivated the consideration of the underutilized millimeter wave (mmWave) frequency spectrum for future broadband cellular communication networks, for example, mmWave (or extremely high frequency) may, for example, include the frequency range between 30 and 300 gigahertz (GHz). Radio waves in this band may, for example, have wavelengths from ten to one millimeters, giving it the name millimeter band or millimeter wave. The amount of wireless data will likely significantly increase in the coming years. Various techniques have been used in attempt to address this challenge including obtaining more spectrum, having smaller cell sizes, and using improved technologies enabling more bits/s/Hz. One element that may be used to obtain more spectrum is to move to higher frequencies, e.g., above 6 GHz. For fifth generation wireless systems (5G), an access architecture for deployment of cellular radio equipment employing mmWave radio spectrum has been proposed. Other example spectrums may also be used, such as cmWave radio spectrum (e.g., 3-30 GHz).

SUMMARY

According to an example implementation, a method includes receiving, by a target network node from a source network node in a network during a handover operation, time synchronization data representing a time synchronization accuracy of a user device in the network. The method further includes receiving, by the target network node from the network, time synchronization accuracy budget data representing a time synchronization accuracy budget. The method further includes generating, by the target network node, a time synchronization headroom based on the time synchronization accuracy of the user device and the time synchronization accuracy budget, the time synchronization headroom indicating a remaining time for providing a reference time update transmission to the user equipment.

According to an example implementation, an apparatus includes at least one processor and at least one memory including computer program code, the at least one memory and the computer program code configured to, with the at least one processor, cause the apparatus at least to receive, from a source network node in a network during a handover operation, time synchronization data representing a time synchronization accuracy of a user device in the network. The at least one memory and the computer program code are further configured to, with the at least one processor, cause the apparatus at least to receive, from the network, time synchronization accuracy budget data representing a time synchronization accuracy budget. The at least one memory and the computer program code are further configured to, with the at least one processor, cause the apparatus at least to generate a time synchronization headroom based on the time synchronization accuracy of the user device and the time synchronization accuracy budget, the time synchronization headroom indicating a periodicity of a reference time update transmission to the user equipment.

According to an example implementation, an apparatus includes means for receiving, by a target network node from a source network node in a network during a handover operation, time synchronization data representing a time synchronization accuracy of a user device in the network. The apparatus also includes means for receiving, by the target network node from the network, time synchronization accuracy budget data representing a time synchronization accuracy budget. The apparatus further includes means for generating, by the target network node, a time synchronization headroom based on the time synchronization accuracy of the user device and the time synchronization accuracy budget, the time synchronization headroom indicating a remaining time for providing a reference time update transmission to the user equipment.

According to an example implementation, a computer program product includes a computer-readable storage medium and storing executable code that, when executed by at least one data processing apparatus, is configured to cause the at least one data processing apparatus to receive, from a source network node in a network during a handover operation, time synchronization data representing a time synchronization accuracy of a user device in the network. The executable code, when executed by at least one data processing apparatus, is also configured to cause the at least one data processing apparatus to receive, from the network, time synchronization accuracy budget data representing a time synchronization accuracy budget. The executable code, when executed by at least one data processing apparatus, is also configured to cause the at least one data processing apparatus to, generate a time synchronization headroom based on the time synchronization accuracy of the user device and the time synchronization accuracy budget, the time synchronization headroom indicating a periodicity of a reference time update transmission to the user equipment.

According to an example implementation, a method includes receiving, by a source network node, an indication of a handover to a target network node of a user equipment having a radio resource connection to the source network node. The method further includes generating, by a source network node, time synchronization data representing an estimate of an accuracy of timing information at a user equipment. The method further includes transmitting, by the source node, the time synchronization data to the target network node.

According to an example implementation, an apparatus includes at least one processor and at least one memory including computer program code, the at least one memory and the computer program code configured to, with the at least one processor, cause the apparatus at least to generate time synchronization data representing an estimate of an accuracy of timing information at a user equipment. The at least one memory and the computer program code are further configured to receive an indication of a handover to a target network node of a user equipment having a radio resource connection to the apparatus. The at least one memory and the computer program code are further configured to transmit the time synchronization data to the target network node.

According to an example implementation, an apparatus includes means for receiving, by a source network node, an indication of a handover to a target network node of a user equipment having a radio resource connection to the source network node. The apparatus also includes means for generating, by a source network node, time synchronization data representing an estimate of an accuracy of timing information at a user equipment. The apparatus further includes means for transmitting, by the source node, the time synchronization data to the target network node.

According to an example implementation, a computer program product includes a computer-readable storage medium and storing executable code that, when executed by at least one data processing apparatus, is configured to cause the at least one data processing apparatus to generate time synchronization data representing an estimate of an accuracy of timing information at a user equipment. The executable code, when executed by at least one data processing apparatus, is also configured to cause the at least one data processing apparatus to receive an indication of a handover to a target network node of a user equipment having a radio resource connection to the apparatus. The executable code, when executed by at least one data processing apparatus, is also configured to cause the at least one data processing apparatus to transmit the time synchronization data to the target network node.

According to an example implementation, a method includes receiving, by a user equipment from a source network node, a handover command indicating to the user equipment to switch a source of time synchronization from the source network node to a target network node, the handover command including time synchronization accuracy feedback data representing a time synchronization accuracy feedback generated by the target network node.

According to an example implementation, an apparatus includes at least one processor and at least one memory including computer program code, the at least one memory and the computer program code configured to, with the at least one processor, cause the apparatus at least to receive, from a source network node, a handover command indicating to the user equipment to switch a source of time synchronization from the source network node to a target network node, the handover command including time synchronization accuracy feedback data representing a time synchronization accuracy feedback generated by the target network node.

According to an example implementation, an apparatus includes means for receiving, by a user equipment from a source network node, a handover command indicating to the user equipment to switch a source of time synchronization from the source network node to a target network node, the handover command including time synchronization accuracy feedback data representing a time synchronization accuracy feedback generated by the target network node.

According to an example implementation, a computer program product includes a computer-readable storage medium and storing executable code that, when executed by at least one data processing apparatus, is configured to cause the at least one data processing apparatus to receive, from a source network node, a handover command indicating to the user equipment to switch a source of time synchronization from the source network node to a target network node, the handover command including time synchronization accuracy feedback data representing a time synchronization accuracy feedback generated by the target network node.

The details of one or more examples of implementations are set forth in the accompanying drawings and the description below. Other features will be apparent from the description and drawings, and from the claims.

BRIEF DESCRIPTION OF THE DRAWINGS

FIG. 2 is a diagram illustrating a time synchronization process during a handover according to an example implementation.

FIGS. 3A-3C form a sequence diagram illustrating a handover with an improved time synchronization accuracy at the user equipment, according to an example implementation.

FIG. 5 is a flow chart illustrating an estimation of time synchronization according to an example implementation.

FIG. 6 is a flow chart illustrating an estimation of time synchronization according to an example implementation.

DETAILED DESCRIPTION

Figure 1:
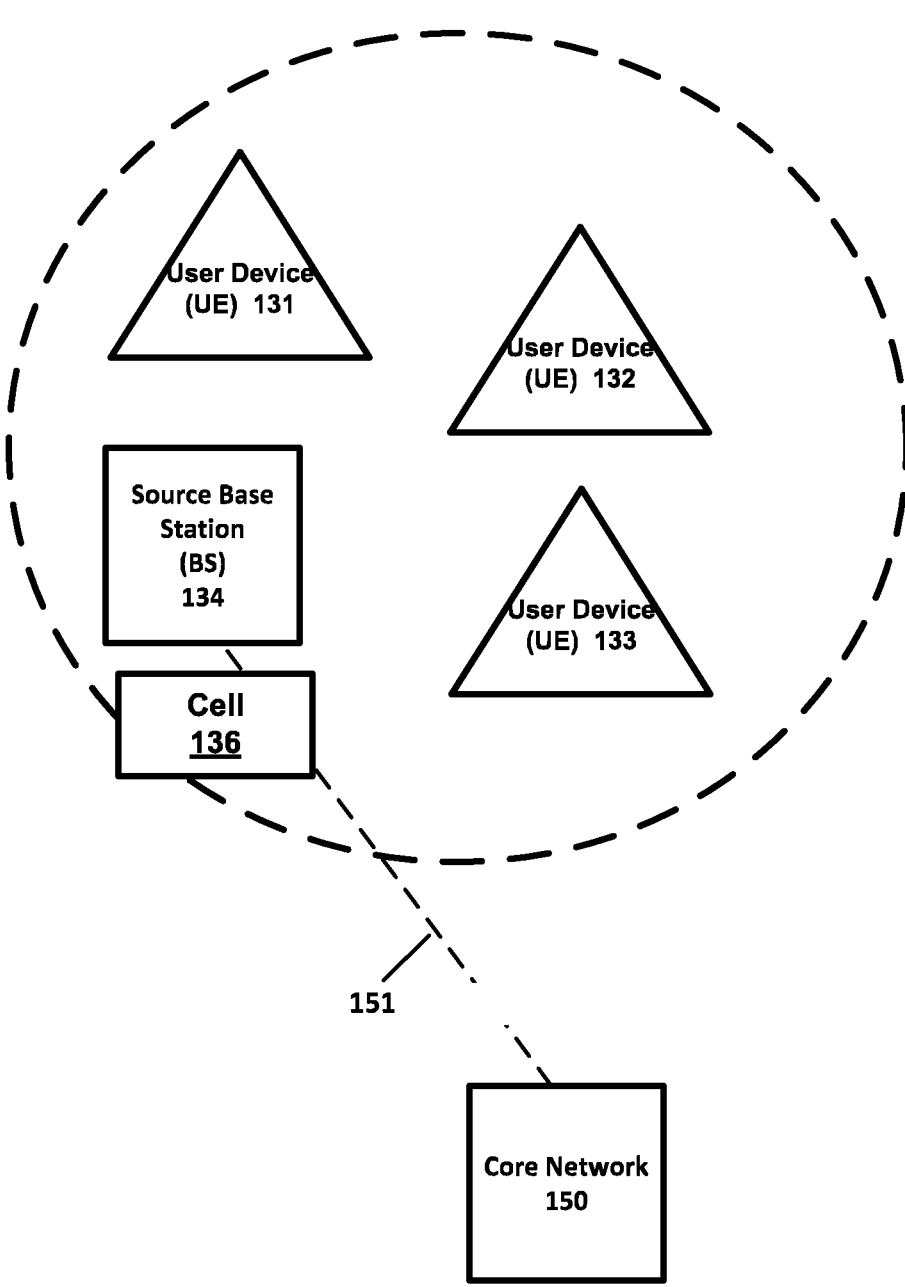
FIG. 1 is a block diagram of a digital communications network according to an example implementation.

FIG. 1 is a block diagram of a digital communications system such as a wireless network 130 according to an example implementation. In the wireless network 130 of FIG. 1, user devices 131, 132, and 133, which may also be referred to as mobile stations (MSs) or user equipment (UEs), may be connected (and in communication) with a base station (BS) 134, which may also be referred to as an access point (AP), an enhanced Node B (eNB), a gNB (which may be a 5G base station) or a network node. At least part of the functionalities of an access point (AP), base station (BS) or (e) Node B (eNB) also may be carried out by any node, server or host which may be operably coupled to a transceiver, such as a remote radio head. BS (or AP) 134 provides wireless coverage within a cell 136, including the user devices 131, 132 and 133. Although only three user devices are shown as being connected or attached to BS 134, any number of user devices may be provided. BS 134 is also connected to a core network 150 via an interface 151. This is merely one simple example of a wireless network, and others may be used.

A user device (user terminal, user equipment (UE)) may refer to a portable computing device that includes wireless mobile communication devices operating with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, and a multimedia device, as examples. It should be appreciated that a user device may also be a nearly exclusive uplink only device, of which an example is a camera or video camera loading images or video clips to a network.

In LTE (as an example), core network 150 may be referred to as Evolved Packet Core (EPC), which may include a mobility management entity (MME) which may handle or assist with mobility/serving cell change of user devices between BSs, one or more gateways that may forward data and control signals between the BSs and packet data networks or the Internet, and other control functions or blocks.

The various example implementations may be applied to a wide variety of wireless technologies, wireless networks, such as LTE, LTE-A, 5G (New Radio, or NR), cmWave, and/or mmWave band networks, or any other wireless network or use case. LTE, 5G, cmWave and mmWave band networks are provided only as illustrative examples, and the various example implementations may be applied to any wireless technology/wireless network. The various example implementations may also be applied to a variety of different applications, services or use cases, such as, for example, ultra-reliability low latency communications (URLLC), Internet of Things (IoT), time-sensitive communications (TSC), enhanced mobile broadband (eMBB), massive machine type communications (MMTC), vehicle-to-vehicle (V2V), vehicle-to-device, etc. Each of these use cases, or types of UEs, may have its own set of requirements.

The service of accurate time synchronization was introduced with 3GPP Release-16. the 5G clock is delivered to a user equipment (UE) via referenceTimeInfo (RTI) IE that together with the estimation of the UE frame boundary (SFN) reference, it enables the UE to be absolute time synchronized to the 5G clock. The UE may obtain RTI via:

Periodically broadcast on downlink shared channel (DL-SCH) (periodicity from 80 ms to 5.12 s).
Broadcast on-demand on DL-SCH.
Unicast on DL-SCH.
Unicast on-demand on DL-SCH.

The scenarios studied in Release-16 were not having any benefit of propagation delay compensation (PDC). This has changed with a tighter synchronization budget for the studied use cases and some requiring wide-area support. For these use cases in a wide-area network PDC is desired.

A tighter synchronization budget also calls for discussing mobility-related aspects of time synchronization. Discussion has focused on whether there would be any need for mobility related enhancements for time synchronization, including metrics to manage time synchronization accuracy "jump" when switching cell, and what signaling is needed (if any) to be carried from a source network node (gNB) to a target gNB to maintain its accurate time synchronization service.

The gNB may estimate the achieved UE time synchronization accuracy and substract this from the provided radio access network (NG-RAN) time synchronization accuracy budget and from the result then adjust its air interface procedures and parameters to aid the UE achieving a higher or lower time synchronization accuracy. The achieved synchronization accuracy at the UE depends on a plurality of factors, including the following:

Accuracy of the distributed clock.
Transmission timing errors at the transmitter and detection error at the receiver side.
The accuracy of the estimated propagation delay.
Holdover capability of the UE.

The performance of the UE may be bound by device capabilities (i.e., worst case performance). The gNB may rely on these performance bounds to estimate the current time synchronization accuracy at the UE.

A 5G NR handover signaling procedure consists of three stages:

Preparation: Based on UE mobility measurement reports, the source gNB decides whether an handover should be initiated. The target gNB is asked whether it is capable of accepting the UE through the Handover Request and Handover Request Ack.
Execution: The Handover Command initiates the handover procedure at the UE. U-plane traffic is handed over to the target and the UE may decide when it will start synchronizing to the target gNB.
Completion: The U-plane path switch is confirmed with the AMF and UPF and UE context is released from the source gNB.

During handover a UE detaches from the source gNB and connects to the target gNB. In a conventional approach to handover, after detaching from the source gNB, the UE does not receive reference time update transmissions (i.e., RTI) until it connects to the target gNB. However, the local clock of the UE has a holdover capability with which it maintains good accuracy of the timing information during the handover procedure. It is desired that the target gNB provides the timing information before the accuracy of the UE local clock deviate from the accuracy needed to remain within the synchronization accuracy budget.

In the conventional approach to handover, the target gNB has little to no knowledge about the current synchronization accuracy of the UE it is being handed over. Without this knowledge, the target gNB may resort to a conservative configuration with high bandwidth reference signals, frequent and urgent availability of reference signals and frequent and urgent delivery of RTI. With no useful knowledge about the current accuracy of the UE, no optimizations may be done to the air interface activities initiated at the target gNB to aid the UEs synchronization accuracy.

In contrast to the above-described conventional approach to handover, improved techniques of handover include the source gNB estimating the accuracy of the timing information that the UE may derive from its local clock during and shortly after the HO procedure and exchange this with the target gNB. Based on this estimate, the target gNB can determine when a timing information update is needed at the UE.

Advantageously, in the above-described improved technique for handover, the target gNB may use a sufficient air interface resources to satisfy the desired UE accuracy budget, i.e., no need to assume a worst-case scenario. This in turn may conserve resources at the target gNB.

That is, the source gNB estimates the accuracy of the timing information that the UE and exchanges this to the target gNB. The target gNB uses this estimate and subtract the estimate from the NG-RAN accuracy budget to determine how much accuracy headroom is left. The target gNB then uses the determined headroom to set up the time synchronization procedure and if possible how to aid the UE achieve the desired synchronization accuracy at the target gNB. This is illustrated in FIGS. 2 and 3A-3C.

FIG. 2 is a diagram illustrating an estimation 200 of time synchronization accuracy.

At 201, the source gNB estimates the UE time synchronization accuracy and signals this to the target gNB.

At 202, the target gNB compares the NG-RAN time synchronization budget (from AMF or source gNB) with the current UE time synchronization accuracy.

At 203, the target gNB determines the air interface parameters needed for the UE to stay within the NG-RAN time synchronization accuracy budget, e.g., start of RTI delivery, RS configuration, and PDC.

At 204, The UE estimates subframe number (SFN) boundary time instance by the available DL RS and sets its clock by the timestamp provided by the RTI.

Figure 3A:
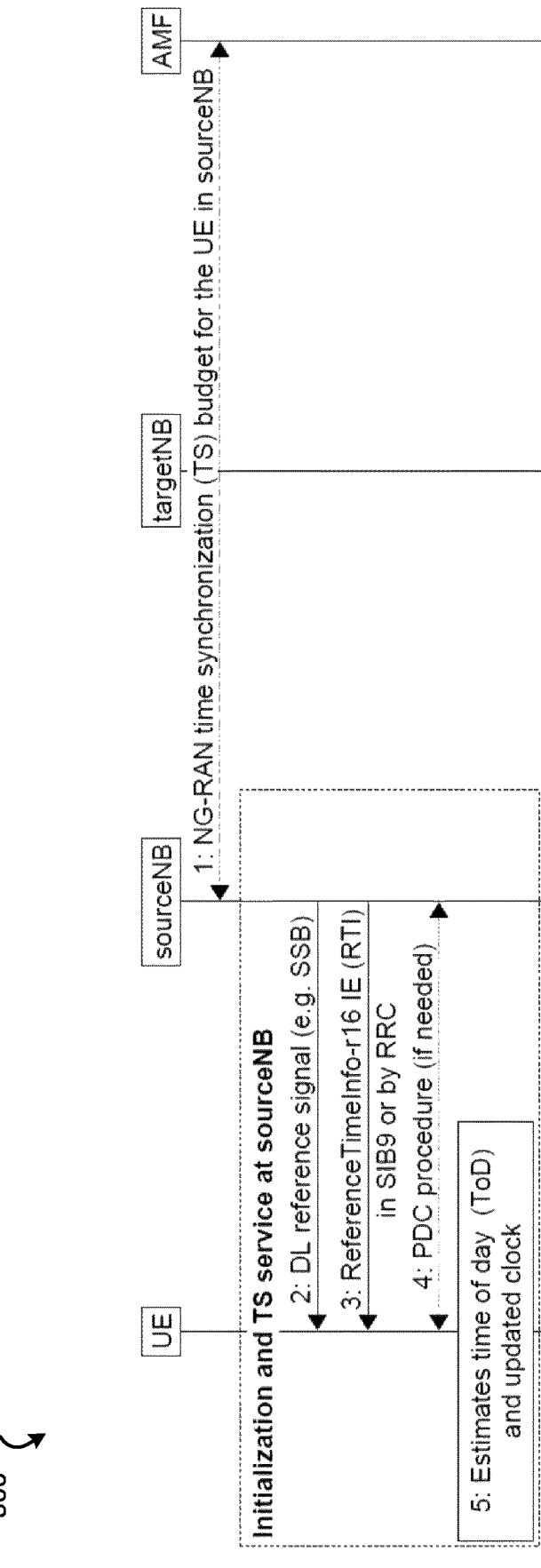
Figure 3C:
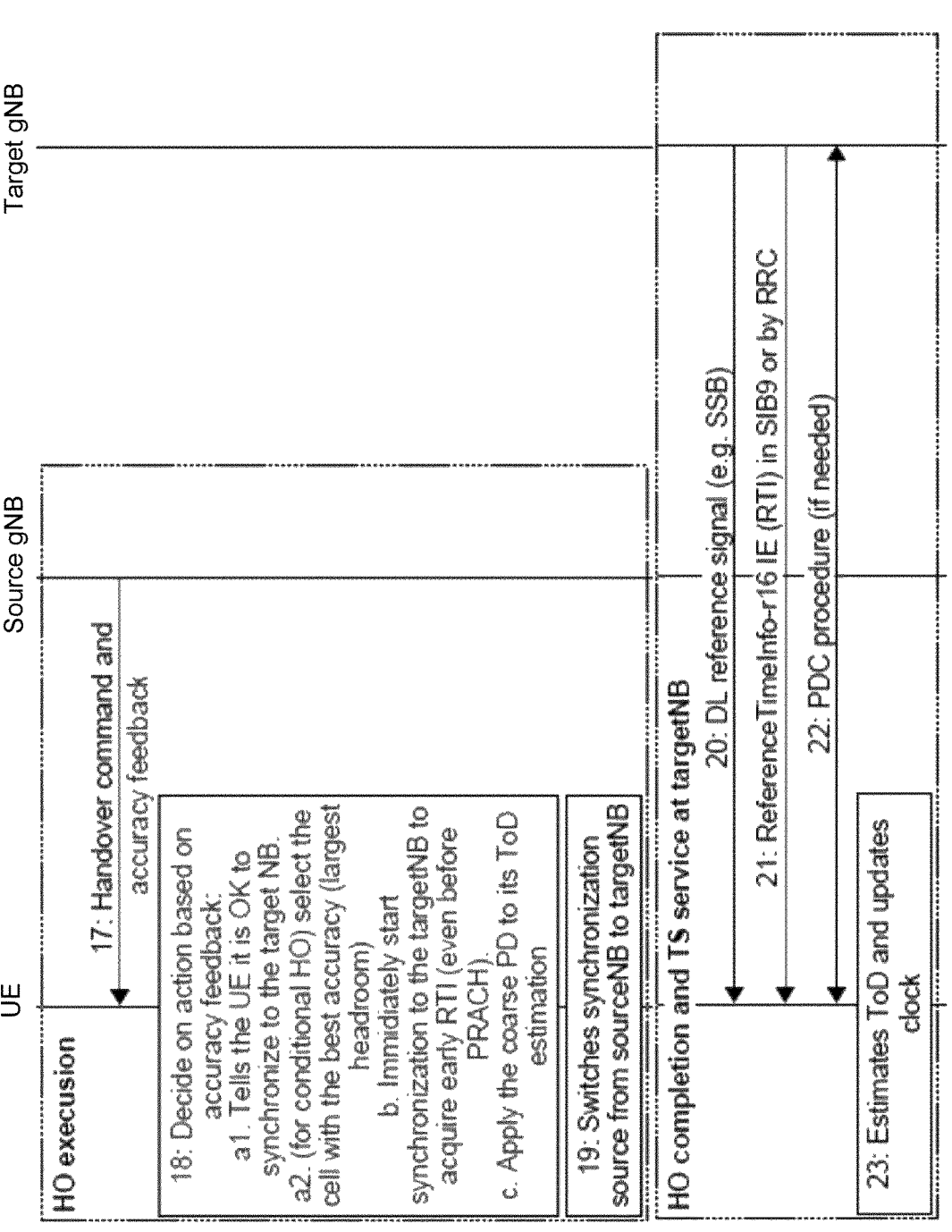

FIGS. 3A-3C form a sequence diagram illustrating a handover with an improved time synchronization accuracy at the user equipment.

FIG. 3A concerns initialization and time synchronization (TS) service at the source gNB. At 1, the source gNB receives the NG-RAN time synchronization accuracy budget from the AMF. At 2, 3, and 4, the source gNB provides the UE with DL reference signals, SFN boundary timestamp (ReferenceTimeInfo IE (RTI) in SIB9 or DLInformation Transfer (RRC)) and maintains a PD estimation loop if needed. At 5, the UE estimates time of arrival (ToA) for every reception of RTI and for every PD update.

FIG. 3B concerns handover (HO) preparation. At 6 and 7, based on mobility measurement reports from the UE, the source gNB makes a handover decision. At 8 and 9, the source gNB estimates the accuracy of the current timing information at the UE. There are different options for how the gNB can estimate this estimation. Moreover, the gNB may initiate a PD update (prior art) or request the UE estimate of its clock accuracy. The gNB can also set the accuracy budget received from the AMF as the estimated accuracy of the current timing information.

At 10 and 11, the source gNB signals the target gNB with the latest estimate of the UE's time synchronization accuracy. It has two options how to capture the effect of UE clock drift in the estimation:

1. Along with the current accuracy, the source gNB appends a timestamp of the latest referenceTimeInfo (RTI) transmit time to or reception time at the UE. The target gNB may then calculate the unavailability time and the error caused by it.

2. The source gNB adds the anticipated error caused by the unavailability of ReferenceTimeInfo IE by including a worst case interruption time and holdover capability.

At 12 and 13, the target gNB receives the NG-RAN time synchronization accuracy budget (from the AMF) and compares this with the current UE time synchronization accuracy to determine the accuracy budget headroom (i.e., how much room is left). Alternatively, in some implementations, the NG-RAN time synchronization budget is parsed from the source gNB to the target gNB over the Xn interface. In this case, the network part of the budget is not corrected (if needed e.g., by a changed network topology). Another option is, the source gNB can indicate synchronization budget for the Xn interface i.e., the difference in time synchronization accuracy between the source gNB and the target gNB. This is especially the case when the source gNB and the target gNB are synchronized with each other using e.g., PTP protocol.

At 14, the target gNB determines the RAN parameters needed for TS. The parameters include DL reference signal configuration (type and bandwidth) (and start of these e.g., prior to RRC connection established), PDC technique (e.g., TA or Rx-Tx based, and configuration of these and possible), and periodicity and start of RTI.

At 15, based on the current UE time synchronization accuracy and the accuracy budget headroom, the target gNB derives the time instant at which the next timing update is needed at the UE where the current UE time synchronization accuracy is based on the latest accuracy estimate provided by the source gNB and the holdover capability of the UE (UE local clock accuracy). The target gNB may signal the source gNB with at least one of the following feedback options:

1. Perform admission control
   a. In one option, the target gNB shall take into account the above derived time instant and the HO delay including the procedural delay at the source and target gNB, to determine if it will able to deliver the timing information in time.
   b. In another option, the source gNB shall be able to calculate the time available for the target gNB to deliver the timing information after the UE connects to the target gNB. Based on the available time, it shall configure the parameters for HO and timing information distribution appropriately.
2. RTI allocations which the UE can use to receive RTI prior to having completed the PRACH procedure.
3. A coarse PD estimate which can enhance the initial synchronization accuracy at the UE (before it is has the PD estimation loop up and running). The target gNB can get this from the LMF or it can be preconfigured (e.g., to half of the cell radii).

At 16, the target gNB sends the Handover Request ACK along with the accuracy feedback derived in 15. Note that the Handover Request ACK can also include parameters to be used by the UE while accessing the target gNB e.g., indicate to the UE which preambles to use to get a contention free PRACH. This can be useful to get an RRC connection and PD estimation loop up faster.

FIG. 3C is concerned with HO execution and completion. At 17, the source gNB provides the handover command, including necessary parameters to execute handover to the UE along with the accuracy feedback from the target gNB.

At 18, the UE determines its actions based on the feedback. Note that reference labels correspond to actions based on corresponding feedback options.

1. From admission control feedback:
   a. Moves synchronization service to the target gNB is OK
   b. If conditional HO is supported, the UE can select the target gNB with relatively large headroom (e.g., with best accuracy), taking into account that other conditions like channel quality are sufficient.
2. Selects which RTI allocation it wants to receive and can plan when to start synchronizing to the target gNB
3. Applies the coarse PD for its ToD estimation At 19, the UE switches to the target gNB as its clock synchronization source. At 20, 21, 22, and 23, time synchronization service running between the UE and the target gNB.

As stated above, there are different options for how the gNB can estimate the accuracy of the current timing information at the UE.

The accuracy includes of the following main components:
a) DL reference signals available for the UE to estimate the DL frame timing and SFN boundary.

b) UL transmissions reveal the current PD (and TA).

c) Propagation delay estimation procedure (if used).

d) UE clock drift and UE hold-over capability.

e) RTI signaling periodicity and granularity.

It is noted that the accuracy estimation examples only apply for the accuracy at the RAN as opposed to end-to-end.

Currently, the gNB can make worst case assumptions by signaling the current NG-RAN budget or resort to conventional models. However, it is anticipated that the above components a), b), and c) are likely to be subject to specified performance requirements and hence helps the gNB estimation more accurate. Component d) is also bounded by UE radio performance parameters and by the time since DL frame timing update. Component e) is known by configuration and is used together with the UE hold-over capability to determine the error is introduced by an unavailability of referenceTimeInfo. The error introduced by the timestamp granularity may also be known by configuration.

The timing error (TE) may be summarized at any given time as follows:

$$TE_{UE} = a)TE_{DL_{RX}} + b)TE_{UL_{RX}} + c)TE_{PD} + d)TE_{HO} + e)TE_{RTI},$$

where the labels before each term correspond to the labels of the main components listed above. The following are example estimates of each component.

a) The UE relies on SSB for DL RX detection (e.g., worst-case assumption used in several RAN4 requirements). For 15 kHz that gives a worst-case error at $\pm130$ ns error.

b) The UE is instructed to transmit a 5 MHz reference signal (e.g., SRS, or DM-RS on PUSCH or PUCCH). The worst-case error for this is estimated to be $\pm130$ ns (e.g., based on RANI evaluations).

c) The UE has a propagation delay of 200 ns corresponding to 66 m away from the gNB. If PDC is used, the gNB would use a PDC TE equation.

d) $\pm44$ ns drift is calculated by the target gNB (as it is in this example provided with a timestamp of the last RTI delivery to the UE from the source gNB) based on the derived unavailability of RTI.

e) The timestamp granularity of RTI is 10 ns and hence the error from the timestamp in RTI is $\pm5$ ns. The gNB may transmit the RTI timestamp slightly offset (due to a TE between the air interface and the generated timestamp). This offset is statistically known by the gNB and is often bound by specified requirements. Here we assume that the TAE requirements for intra-gNB CA set the bound which is then $\pm32$ ns.

In this example the error $TE_{UE}=\pm130$ ns$\pm130$ ns$\pm200$ ns$\pm44$ ns$\pm5$ ns$\pm32$ ns$\leq541$ ns and this value will then be signaled to the target gNB. In some implementations, the UE accuracy is signaled similar as the NG-RAN budget.

Note that in the above example, the target gNB also has the UE NG-RAN time synchronization budget available, which in this case is 700 ns. That means that the accuracy headroom is 700 ns−509 ns=191 ns. The 191 ns can be used by the target gNB to accommodate PDC, a larger PD of about 60 m or postponing the RTI delivery by several hundreds of milliseconds.

If PDC is used, the following expression for $TE_{PD}$ can be used as an example.

$$TE_{PD} = -0.5a)TE_{DL_{RX}} - 0.5b)TE_{EL_{RX}} + 0.5TE_{PD_{signal}} + 0.5TE_{Te},$$

where $TE_{PD_{signal}}$ is the error caused by the signaling granularity of the PD signal (e.g., timing advance command for timing advance based PDC) and $TE_{Te}$ is the worst case error of applying the PD estimate at the UE (e.g., Te for timing advance). The minus sign reflects that the same DL and UL RX is used for PD estimation as well as for the overall sync accuracy estimation in this example.

Continuing the above example and reusing the same reference signal configurations, $TE_{PD}=\mp0.5\cdot130$ ns$\mp0.5\cdot130$ ns$\pm0.5\cdot260$ ns$\pm0.5\cdot391$ ns$\leq326$ ns introduced by PDC. Then the signaled UE accuracy will be $TE_{UE}=\pm130$ ns$\pm130$ ns$+326$ ns$\pm44$ ns$\pm5$ ns$\pm32$ ns$\leq667$ ns. When signaled to the target gNB it will derive a headroom of just 32 ns or corresponding to 10 m of PD or around a few tens of milliseconds additional referenceTimeInfo (RTI) unavailability time. The target gNB will in this case prioritize the delivery of referenceTimeInfo to this UE (e.g., by unicast RRC messaging).

To determine the configuration of RTI at the target gNB, the following parameters can be considered:

Uu synchronicity budget (i.e., time synchronization accuracy budget): This parameter could be provided by the CN (e.g., AMF) or the source gNB and should be part of the UE context information stored at the gNB. This budget will influence RTI configuration (e.g., periodicity required). Due to the synchronization topology may be different at the source gNB compared to the target gNB (e.g., where the gNB GM is placed in the network could impact the network part of the E2E accuracy budget), in some cases the Uu budget may need to be updated at the CN before being provided to the target gNB.

Source gNB budget (i.e., estimate of an accuracy of timing information at a user equipment): The source gNB provides to the target gNB the last estimated accuracy of the provided timing information at the UE (e.g., based on worst case assumption or RANI models). This parameter can be used at the target gNB to determine the accuracy budget headroom.

Other parameters that may influence the RTI configuration at the target gNB can be considered.

Figure 4:
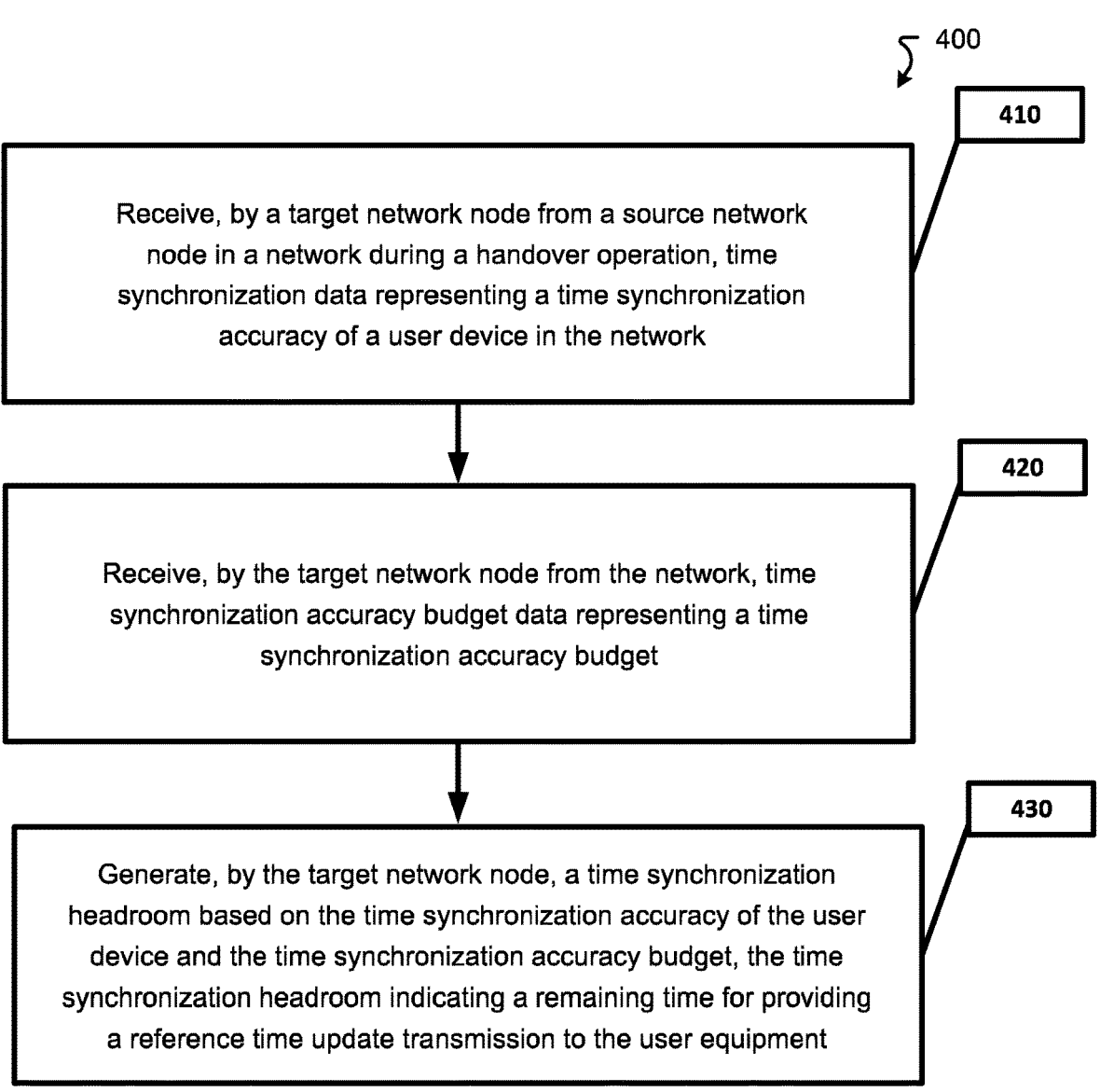
FIG. 4 is a flow chart illustrating an estimation of time synchronization accuracy according to an example implementation

FIG. 4 is a flow chart illustrating a method of estimating time synchronization accuracy according to an example implementation. At 410, the method includes receiving, by a target network node from a source network node in a network during a handover operation, time synchronization data representing a time synchronization accuracy of a user device in the network. At 420, the method includes receiving, by the target network node from the network, time synchronization accuracy budget data representing a time synchronization accuracy budget. At 430, the method includes generating, by the target network node, a time synchronization headroom based on the time synchronization accuracy of the user device and the time synchronization accuracy budget, the time synchronization headroom indicating a remaining time for providing a reference time update transmission to the user equipment.

FIG. 5 is a flow chart illustrating a method of estimating time synchronization according to an example implementation. At 510, the method includes receiving, by a source network node, an indication of a handover to a target network node of a user equipment having a radio resource connection to the source network node. At 520, the method includes generating, by a source network node, time synchronization data representing an estimate of an accuracy of timing information at a user equipment. At 530, the method includes transmitting, by the source node, the time synchronization data to the target network node.

FIG. 6 is a flow chart illustrating a method of estimating time synchronization according to an example implementation. At 610, the method includes receiving, by a user equipment from a source network node, a handover command indicating to the user equipment to switch a source of time synchronization from the source network node to a target network node, the handover command including time synchronization accuracy feedback data representing a time synchronization accuracy feedback generated by the target network node.

List of Example Abbreviations

Figure 7:
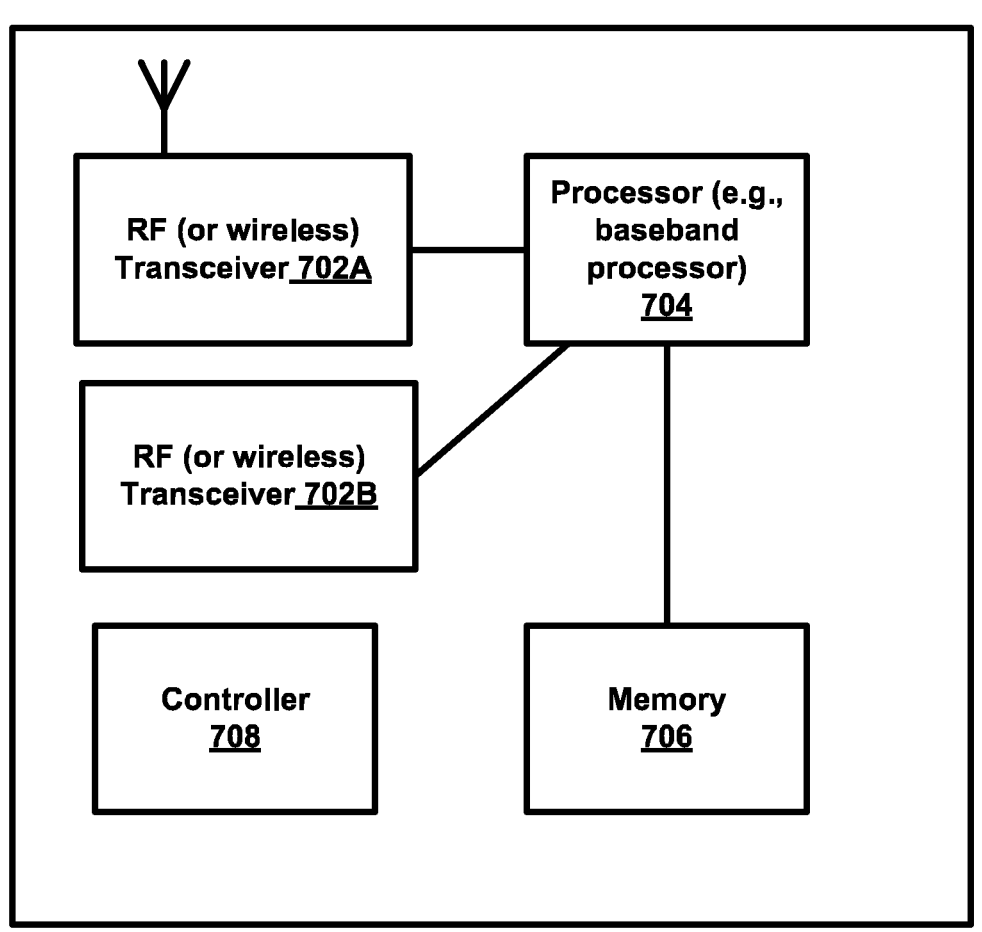
FIG. 7 is a block diagram of a node or wireless station (e.g., base station/access point, relay node, or mobile station/ user device) according to an example implementation.

5GS—5G System
AMF—Access and Mobility Management Function
GM—Grand Master
HO—Handover
PDC—Propagation Delay Compensation
PTP—Precision Time Protocol
RRC—Radio Resource Control
RTI—ReferenceTimeInfo
SFN—Subframe Number
TA—Timing Advance
TSN—Time Sensitive Networking FIG. 7 is a block diagram of a wireless station (e.g., AP, BS, e/gNB, NB-IoT UE, UE or user device) 700 according to an example implementation. The wireless station 700 may include, for example, one or multiple RF (radio frequency) or wireless transceivers 702A, 702B, where each wireless transceiver includes a transmitter to transmit signals (or data) and a receiver to receive signals (or data). The wireless station also includes a processor or control unit/entity (controller) 704 to execute instructions or software and control transmission and receptions of signals, and a memory 706 to store data and/or instructions.

Processor 704 may also make decisions or determinations, generate slots, subframes, packets or messages for transmission, decode received slots, subframes, packets or messages for further processing, and other tasks or functions described herein. Processor 704, which may be a baseband processor, for example, may generate messages, packets, frames or other signals for transmission via wireless transceiver 702 (702A or 702B). Processor 704 may control transmission of signals or messages over a wireless network, and may control the reception of signals or messages, etc., via a wireless network (e.g., after being down-converted by wireless transceiver 702, for example). Processor 704 may be programmable and capable of executing software or other instructions stored in memory or on other computer media to perform the various tasks and functions described above, such as one or more of the tasks or methods described above. Processor 704 may be (or may include), for example, hardware, programmable logic, a programmable processor that executes software or firmware, and/or any combination of these. Using other terminology, processor 704 and transceiver 702 together may be considered as a wireless transmitter/receiver system, for example.

In addition, referring to FIG. 7, a controller (or processor) 708 may execute software and instructions, and may provide overall control for the station 700, and may provide control for other systems not shown in FIG. 7 such as controlling input/output devices (e.g., display, keypad), and/or may execute software for one or more applications that may be provided on wireless station 700, such as, for example, an email program, audio/video applications, a word processor, a Voice over IP application, or other application or software.

In addition, a storage medium may be provided that includes stored instructions, which when executed by a controller or processor may result in the processor 704, or other controller or processor, performing one or more of the functions or tasks described above.

According to another example implementation, RF or wireless transceiver(s) 702A/702B may receive signals or data and/or transmit or send signals or data. Processor 704 (and possibly transceivers 702A/702B) may control the RF or wireless transceiver 702A or 702B to receive, send, broadcast or transmit signals or data.

The embodiments are not, however, restricted to the system that is given as an example, but a person skilled in the art may apply the solution to other communication systems. Another example of a suitable communications system is the 5G concept. It is assumed that network architecture in 5G will be quite similar to that of the LTE-advanced. 5G uses multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Implementations may also be provided on a computer readable medium or computer readable storage medium, which may be a non-transitory medium. Implementations of the various techniques may also include implementations provided via transitory signals or media, and/or programs and/or software implementations that are downloadable via the Internet or other network(s), either wired networks and/or wireless networks. In addition, implementations may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, implementations of the various techniques described herein may use a cyber-physical system (CPS) (a system of collaborating computational elements controlling physical entities). CPS may enable the implementation and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various implementations of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. An apparatus, comprising:

at least one processor; and at least one memory including computer program code;

the at least one memory and the computer program code configured to cause the apparatus at least to:

receive, from a source network node in a network during a handover operation, time synchronization data representing a time synchronization accuracy of a user equipment in the network;

receive, from the network, time synchronization accuracy budget data representing a time synchronization accuracy budget; and generate a time synchronization headroom based on the time synchronization accuracy of the user equipment and the time synchronization accuracy budget, the time synchronization headroom indicating a periodicity of a time update transmission to the user equipment;

determine an instant of time at which a timing update is to be transmitted to the user equipment, the instant of time being based on the time synchronization data received from the source network node and a time and frequency stability of the user equipment.

2. The apparatus of claim 1, wherein the time synchronization data includes timestamp data representing a timestamp of a reference time update transmit time to or reception time at the user equipment; and the at least one memory and the computer program code configured to further cause the apparatus to generate an unavailability time based on the timestamp.

3. The apparatus of claim 1, wherein the at least one memory and the computer program code configured to further cause the apparatus to determine whether the timing update is able to be delivered to the user equipment based on the generated instant of time and a handover delay.

4. An apparatus, comprising:

at least one processor; and at least one memory including computer program code;

the at least one memory and the computer program code configured to cause the apparatus at least to:

generate time synchronization data representing an estimate of an accuracy of timing information at a user equipment;

receive an indication of a handover to a target network node of a user equipment having a radio resource connection to the apparatus; and transmit the time synchronization data to the target network node;

receive accuracy feedback from the target network node, wherein the accuracy feedback dependent at least in part on an instant of time at which a timing update is to be transmitted by the target network node to the user equipment, the instant of time being based on the time synchronization data and a time and frequency stability of the user equipment.

5. The apparatus of claim 4, wherein generating the time synchronization data includes appending, to the time synchronization data, timestamp data representing a timestamp of a reference time update transmit time to or reception time at the user equipment.

6. The apparatus of claim 4, wherein generating the time synchronization data includes adding, to the time synchronization data, an anticipated error caused by an unavailability of a reference time update at the user equipment.

7. The apparatus of in claim 6, wherein the anticipated error is based on a worst-case interruption time.

8. The apparatus of claim 4, wherein the at least one memory and the computer program code configured to further cause the apparatus to transmit time synchronization accuracy budget data representing a time synchronization accuracy budget to the target network node over a Xn interface.

9. The apparatus of claim 4, wherein the at least one memory and the computer program code configured to further cause the apparatus to generate a time available for the target network node to deliver timing information to the user equipment after the user equipment connects to the target network node.

10. The apparatus of claim 9, wherein the at least one memory and the computer program code configured to further cause the apparatus to configure the handover based on the generated time available for the target network node.

11. The apparatus of claim 4, wherein generating the estimate of accuracy of timing information of the user equipment is based on a second time synchronization accuracy budget obtained from a network.

12. An apparatus, comprising:

at least one processor; and at least one memory including computer program code;

the at least one memory and the computer program code configured to cause the apparatus at least to:

receive, from a source network node, a handover command indicating to the apparatus to switch a source of time synchronization from the source network node to a target network node, the handover command including time synchronization accuracy feedback data representing a time synchronization accuracy feedback generated by the target network node;

wherein the time synchronization accuracy feedback dependent at least in part on an instant of time at which a timing update is to be transmitted by the target network node to the apparatus, the instant of time being based on time synchronization data received by the target network node and a time and frequency stability of the apparatus.

13. The apparatus as in claim 12, wherein the time synchronization accuracy feedback includes a determination of whether a time synchronization accuracy at the apparatus is within a time synchronization accuracy budget provided by a network to the target network node.

14. The apparatus as in claim 12, wherein the handover command represents a conditional handover and the target network node is one of a plurality of candidate target network nodes, and wherein the time synchronization accuracy feedback is received from each of the plurality of candidate target network nodes and the feedback from each of the candidate target network nodes includes a respective time synchronization accuracy headroom indicating an amount of time synchronization error left in a time synchronization accuracy budget.

15. The apparatus as in claim 12, wherein the at least one memory and the computer program code configured to further cause the apparatus to, in response to receiving the handover command, select, as the target network node, a candidate target network node having the largest time synchronization accuracy headroom.

16. The apparatus as in claim 12, wherein the time synchronization accuracy feedback includes an allocation of reference time update to enable the apparatus to receive a reference time update prior to having completed a physical random access procedure.

17. The apparatus as in claim 16, wherein the at least one memory and the computer program code configured to further cause the apparatus to, in response to receiving the handover command, select a reference time update for reception.

18. The apparatus as in claim 12, wherein the time synchronization accuracy feedback includes an estimate of a propagation delay between the apparatus and the target network node.

19. The apparatus as in claim 17, wherein the at least one memory and the computer program code configured to further cause the apparatus to, in response to receiving the handover command, apply the estimate of the propagation delay to a time-of-departure budget.

* * * * *